(12) United States Patent
Martin (10) Patent No.: US 8,768,889 B1
(45) Date of Patent: Jul. 1, 2014

(54) METHOD AND APPARATUS FOR PERFORMING LOCK-FREE UPDATES IN A LINKED LIST

(75) Inventor: Paul A. Martin, Arlington, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1927 days.

(21) Appl. No.: 10/820,661

(22) Filed: Apr. 7, 2004

(51) Int. Cl.
*G06F 7/00* (2006.01)
(52) U.S. Cl.
USPC .......................................... 707/649; 707/800
(58) Field of Classification Search
USPC ........................................ 707/649, 644, 800
See application file for complete search history.

(56) References Cited

U.S. PATENT DOCUMENTS

| | | | | |
|---|---|---|---|---|
| 4,853,842 | A | * | 8/1989 | Thatte et al. ................... 707/206 |
| 7,225,210 | B2 | * | 5/2007 | Guthrie, II .................... 707/205 |

OTHER PUBLICATIONS

Lippman et al, "C++ Primer," 3rd Edition, published on Apr. 2, 1998, by Addison Wesley Professoinal.*
McGregror, "Practical C++," published on Aug. 11, 1999, by Que.*
Harris, NPL, "A Pragmatic Implementation of Non-Blocking Linked-Lists," Proceedings of the 15th International Symposium on Distributed Computing, pp. 300-14 in Oct. 2001.*

* cited by examiner

*Primary Examiner* — Usmaan Saeed
*Assistant Examiner* — Paul Kim
(74) *Attorney, Agent, or Firm* — Park, Vaughan, Fleming & Dowler LLP; A. Richard Park (57) ABSTRACT

One embodiment of the present invention provides a system that performs a lock-free update to one or more fields in an existing node in a linked list. To perform the update, the system first obtains a new node to be added to the linked list, wherein other processes do not possess references to the new node and therefore cannot initially access the new node. Next, the system copies a snapshot of the existing node to the new node, and then updates one or more fields in the new node that correspond to the one or more fields in the existing node. Next, in a single atomic operation the system modifies a next pointer of the existing node to point to the new node and also marks the next pointer to indicate that the existing node is deleted. In this way, the new node becomes part of the linked list and the existing node is deleted in a single atomic operation.

33 Claims, 7 Drawing Sheets

METHOD AND APPARATUS FOR PERFORMING LOCK-FREE UPDATES IN A LINKED LIST

BACKGROUND

1. Field of the Invention

The present invention relates to the design of lock-free data structures within computer systems. More specifically, the present invention relates to a method and apparatus for performing lock-free updates to nodes in a linked list.

2. Related Art

Operations on linked lists become more complicated in a multi-threaded environment, because concurrently executing threads can potentially interfere with each other while accessing the same linked list. In order to prevent such interference, some linked list implementations use locks to prevent different threads from interfering with each other. Unfortunately, locks often cause processes to stall, which can lead to significant performance problems, especially in systems that support large numbers of concurrently executing processes.

Because of the performance problems that arise from locks, a number of researchers have developed "lock-free" data structures, such as linked lists, that operate efficiently in a multi-threaded environment. Harris describes a way to build and modify a lock-free linked list that can be constructed using only load-linked (LL)/store-conditional (SC) or compare-and-swap (CAS) instructions (see Timothy L. Harris, "A Pragmatic Implementation of Non-Blocking Linked-Lists," *Proceedings of the* 15*th International Symposium on Distributed Computing*, October 2001, pp. 300-14). Michael uses a variant of the Harris linked-list as the underlying structure for a lock-free hash table (see Maged M. Michael, "High Performance Dynamic Lock-Free Hash Tables and List-Based Sets," *The* 14*th Annual ACM Symposium on Parallel Algorithms and Architectures*, pages 73-82, August 2002).

Unfortunately, in the above-described lock-free linked list designs, the linked lists are used only as sets—the fields inside their constituent nodes cannot be altered in a lock-free manner. This makes such linked lists (as well as more complex data structures formed from them) less useful in applications where nodes within the linked lists have fields (other than the next-node pointers that form the lists) that logically require changing. Consequently, nodes in the above-described lock-free linked lists can be inserted, searched for, deleted, but NOT altered.

Hence, what is needed is a method and an apparatus for performing lock-free updates to fields within nodes in a lock-free linked list.

SUMMARY

One embodiment of the present invention provides a system that performs a lock-free update to one or more fields in an existing node in a linked list. To perform the update, the system first obtains a new node to be added to the linked list, wherein other processes do not possess references to the new node and therefore cannot initially access the new node. Next, the system copies a snapshot of the existing node to the new node, and then updates one or more fields in the new node that correspond to the one or more fields in the existing node. Next, in a single atomic operation the system modifies a next pointer of the existing node to point to the new node and also marks the next pointer to indicate that the existing node is deleted. In this way, the new node becomes part of the linked list and the existing node is deleted in a single atomic operation.

In a variation on this embodiment, after the existing node has been deleted, the system splices the existing node out of the linked list by atomically modifying the next pointer of a node immediately preceding the existing node in the linked list to point to the new node, instead of pointing to the existing node.

In a further variation, if a process that deleted the existing node does not perform the splicing operation, another process, which subsequently detects that the existing node has been deleted, performs the splicing operation.

In a variation on this embodiment, copying a snapshot of the existing node to the new node involves first copying the contents of the existing node to the new node, and then examining the next pointer of the existing node to determine if the existing node has been deleted. If the existing node has been deleted, the system takes a remedial action. This remedial action can involve following the next pointer of the existing node in an attempt to find an updated version of the existing node, and if an updated version of the existing node is found, copying a snapshot of the updated version of the existing node to the new node.

In a variation on this embodiment, the system deletes a target node from the linked list by atomically marking a next pointer in the target node to indicate that the target node is deleted. Next, the system atomically modifies the next pointer of a node immediately preceding the target node in the linked list to point to a node immediately following the target node in the linked list, instead of pointing to the target node, thereby splicing the target node out of the linked list.

In a further variation, after the target node is spliced out of the linked list, the system modifies the next pointer of the target node so that the next pointer remains marked but points to a node immediately preceding the target node instead of the node immediately following node the target node in the linked list.

In a variation on this embodiment, the system inserts an additional node into the linked list. In doing so, the system first identifies a node immediately preceding the additional node in the linked list, and also identifies a node immediately following the additional node in the linked list. Next, the system splices the additional node into the linked list by, setting the next pointer for the additional node to point to the immediately following node, and then atomically updating the next pointer of the immediately preceding node to point to the additional node.

In a variation on this embodiment, the system reads a snapshot of multiple fields from a target node in the linked list. This involves reading the multiple fields from the target node, and then examining the next pointer of the target node to determine if the target node has been deleted. If the target node has been deleted, the system takes a remedial action. This remedial action can involve following the next pointer of the target node in an attempt to find an updated version of the target node, and if an updated version of the target node is found, repeating the process of reading a snapshot of the multiple fields from the updated version of the target node.

In a variation on this embodiment, atomically modifying the next pointer of the existing node to indicate that the existing node is deleted involves setting a "deleted bit" in the next pointer.

In a variation on this embodiment, while atomically modifying the next pointer of the existing node, if the next pointer indicates that the existing node is already deleted, the atomic modification operation fails and the system takes a remedial action to deal with the fact that the existing node is already deleted.

In a variation on this embodiment, a given node in the linked list includes: a key that contains an identifier for the given node; one or more fields containing data values or pointers to data values associated with the given node; and a next pointer that contains the address of a node that immediately follows the given node in the linked list, and that also contains a deleted indicator, which indicates whether the given node has been deleted.

In a variation on this embodiment, the system periodically performs a garbage-collection operation to reclaim deleted nodes that have become unreachable.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
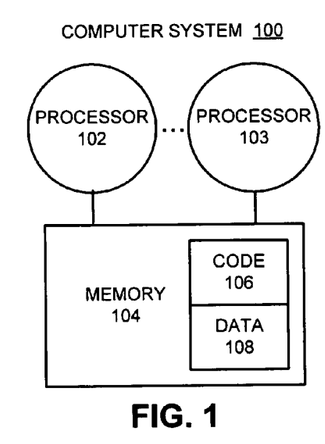
FIG. 1 illustrates a computer system in accordance with an embodiment of the present invention.

FIG. 1 illustrates a computer system 100 in accordance with an embodiment of the present invention. Computer system 100 can generally include any type of computer system with one or more processors. Hence, computer system 100 can include, but is not limited to, a microprocessor, a mainframe computer, a digital processor, a personal computing device, a personal organizer, a device controller, and a computational engine within an appliance—in all these cases the system may have a single or multiple processors.

Computer system 100 includes one or more processors 102-103 that access a memory 104. Memory 104 contains code 106 that performs the below-described linked list operations. Memory also stores data 108, which includes the data structures and other variables associated with the below-described linked list operations.

Note that the below-described linked list operations can also apply to a more-complicated data structures that are based on linked lists. For example, certain implementations of a hash table or a skip list are based on a linked list, and can hence use the same linked list operations.

Linked List Node

Figure 2A:
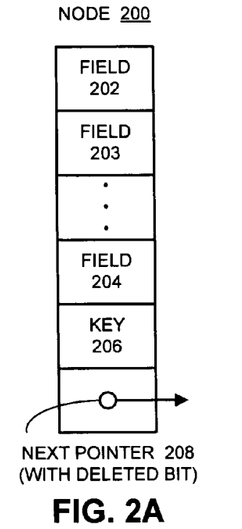
FIG. 2A illustrates a node for a linked list in accordance with an embodiment of the present invention.

FIG. 2A illustrates node 200 for a linked list in accordance with an embodiment of the present invention. Node 200 includes a number of fields 202-204, which store values (or pointers to values) associated with node 200. Node 200 also includes a key 206, which contains a value that can be used to index node 200 within the linked list. Node 200 additionally includes a next pointer 208, which contains the address of an immediately following node in the linked list. In one embodiment of the present invention, next pointer 208 includes a "deleted bit," which indicates whether or not node 200 has been deleted.

Updating Fields in a Linked List Node

Figure 2B:
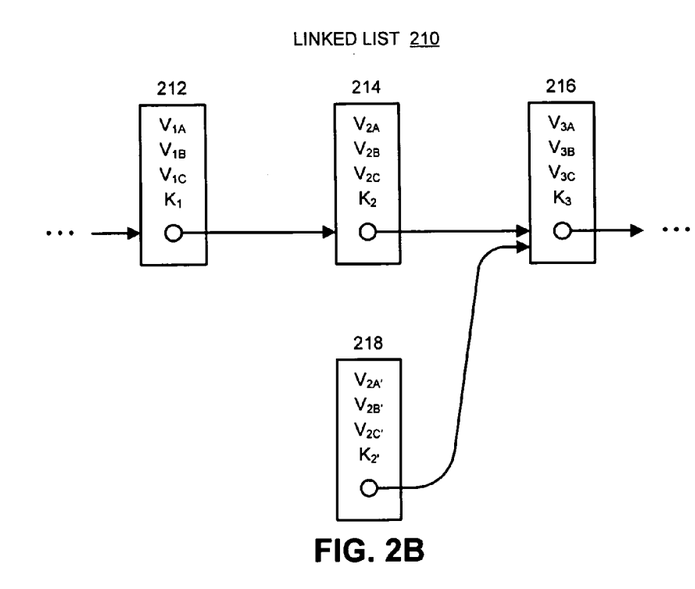
FIG. 2B illustrates a first step in the process of updating fields in a linked list node in accordance with an embodiment of the present invention.
Figure 2C:
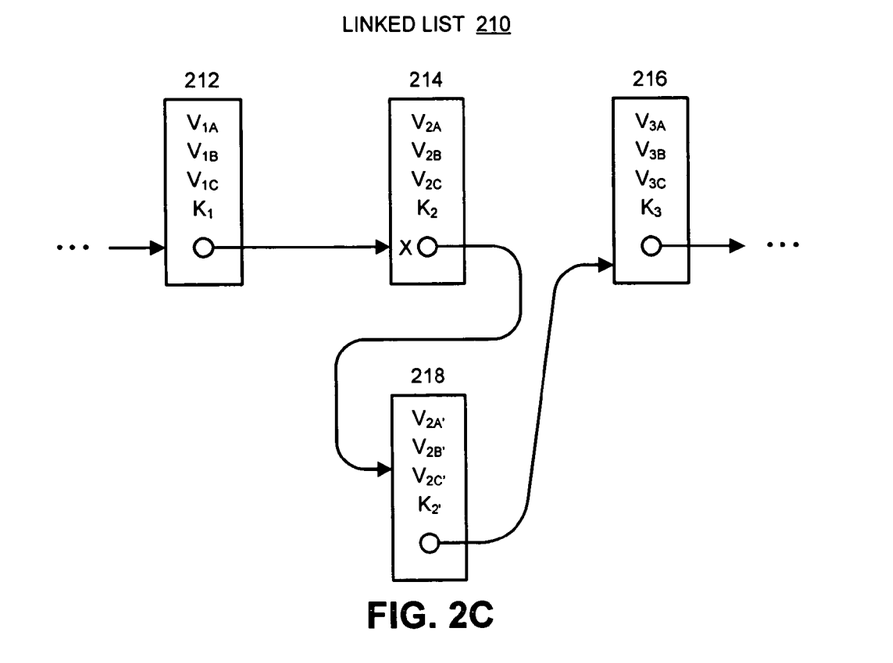
FIG. 2C illustrates a second step in the process of updating fields in a linked list node in accordance with an embodiment of the present invention.
Figure 2D:
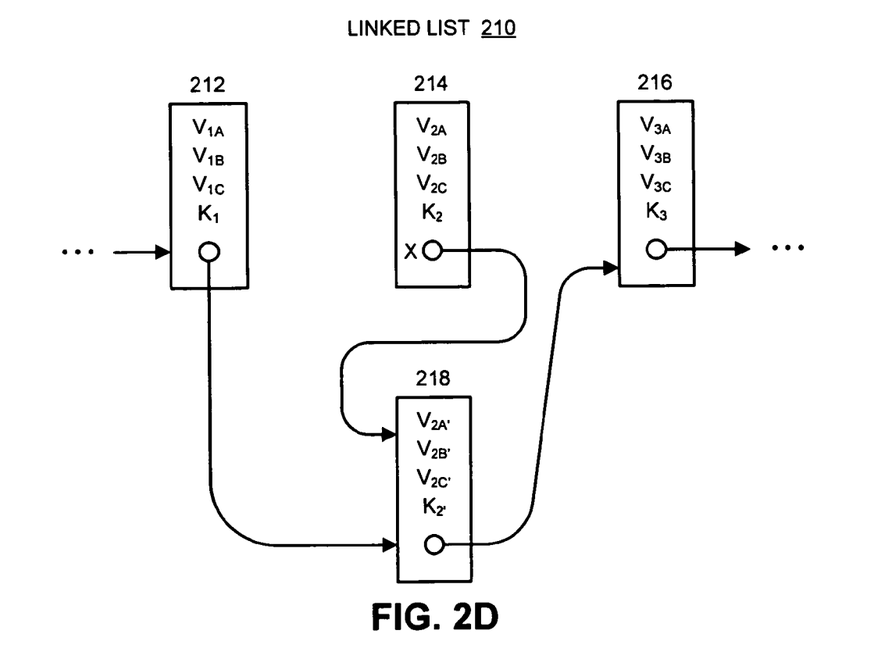
FIG. 2D illustrates a third step in the process of updating fields in a linked list node in accordance with an embodiment of the present invention.
Figure 3:
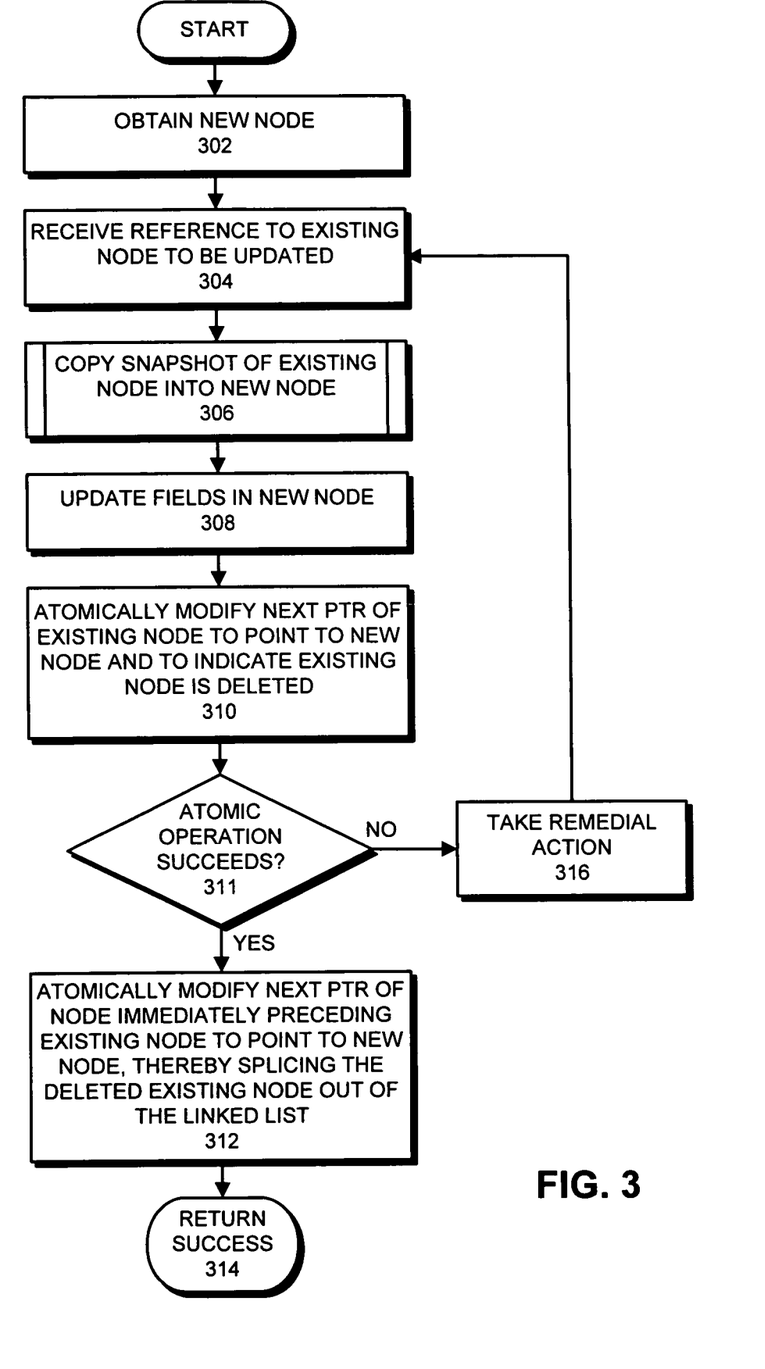
FIG. 3 presents a flow chart illustrating the process of updating fields in a linked list in accordance with an embodiment of the present invention.

FIGS. 2B-D and the flow chart illustrated in FIG. 3A illustrate the process of updating fields in node in a linked list in accordance with an embodiment of the present invention. As is illustrated in FIG. 2B, linked list 210 initially contains nodes 212, 214 and 216.

During the updating process, the system first obtains a new node 218, wherein other processes do not possess references to the new node and therefore cannot initially access the new node (step 302). Next, the system receives a reference to an existing node 214 to be updated in linked list 210 (step 304). Instead of directly updating existing node 214, the system inserts new node 218 with updated fields into linked list 210.

This happens as follows. The system first copies a snapshot of the existing node 214 into the new node 218 (step 306). This copying process is described in more detail below with reference to FIG. 4. After the snapshot is copied, the new node 218 contains copies of the values, $V_{2A}$, $V_{2B}$ and $V_{2C}$, the key, $K_2$, and the next pointer from existing node 214.

Next, the system performs the desired updates to values $V_{2A}$, $V_{2B}$ and $V_{2C}$, to produce modified values, $V_{2A'}$, $V_{2B'}$ and $V_{2C'}$, as is illustrated in FIG. 2B (step 308).

The system then performs a single atomic operation, such as a compare-and-swap, to atomically modify the next pointer of existing node 214 so that it points to new node 218, and also to mark the next pointer to indicate that existing node 214 is deleted (step 310). In this way, existing node 214 is marked as "deleted" and new node 218 is inserted into linked list 210 in a single atomic operation (see FIG. 2C). Note that the "deleted mark" is represented by the "X" that appears beside the next pointer of existing node 214 in FIG. 2C.

In one embodiment of the present invention, the next pointer of existing node 214 contains a special "deleted bit," which indicates whether existing node 214 is deleted. In an alternative embodiment, instead of setting a deleted bit to mark the next pointer, the system creates a special "delete type" node which points to the immediately following node in the linked list, and replaces the next pointer in existing node 214 with a pointer to this special node. It is subsequently possible to determine if existing node 214 is deleted by looking to see if its next pointer points to a "deleted type" node.

After the system performs the atomic operation in step 310, the system determines whether or not the atomic operation succeeded (step 311). (Note that the atomic operation will not succeed if the next pointer of existing node 214 is already marked as deleted.) If the atomic operation does not succeed, the system can take a remedial action (step 316). This can involve locating an updated version of the existing node and then updating the updated version. Or, if an updated version cannot be located, the remedial action can simply involve inserting a new node with the updated values into the linked list. After the remedial action is complete, the system returns to step 304 to retry the updating operation.

If the atomic operation succeeds at step 311, the system splices existing node 214 out of the linked list by atomically modifying the next pointer of node 212, which immediately precedes existing node 214 in linked list 210, to point to new node 218, instead of pointing to the existing node 214 (step 312) (see FIG. 2D). The system then returns a success (step 314). If this atomic operation fails, there can be an additional remedial action, which is not shown in the flow chart.

If for some reason the process that deleted the existing node does not perform the splicing operation, another process, which subsequently detects that the existing node has been deleted, can perform the splicing operation. Note that the process that deleted the existing node 214 can fail to perform the splicing operation because: preceding node 212 is deleted; a new node is inserted into linked list 210 and is now the predecessor of existing node 214; or the process simply stalls.

Figure 4:
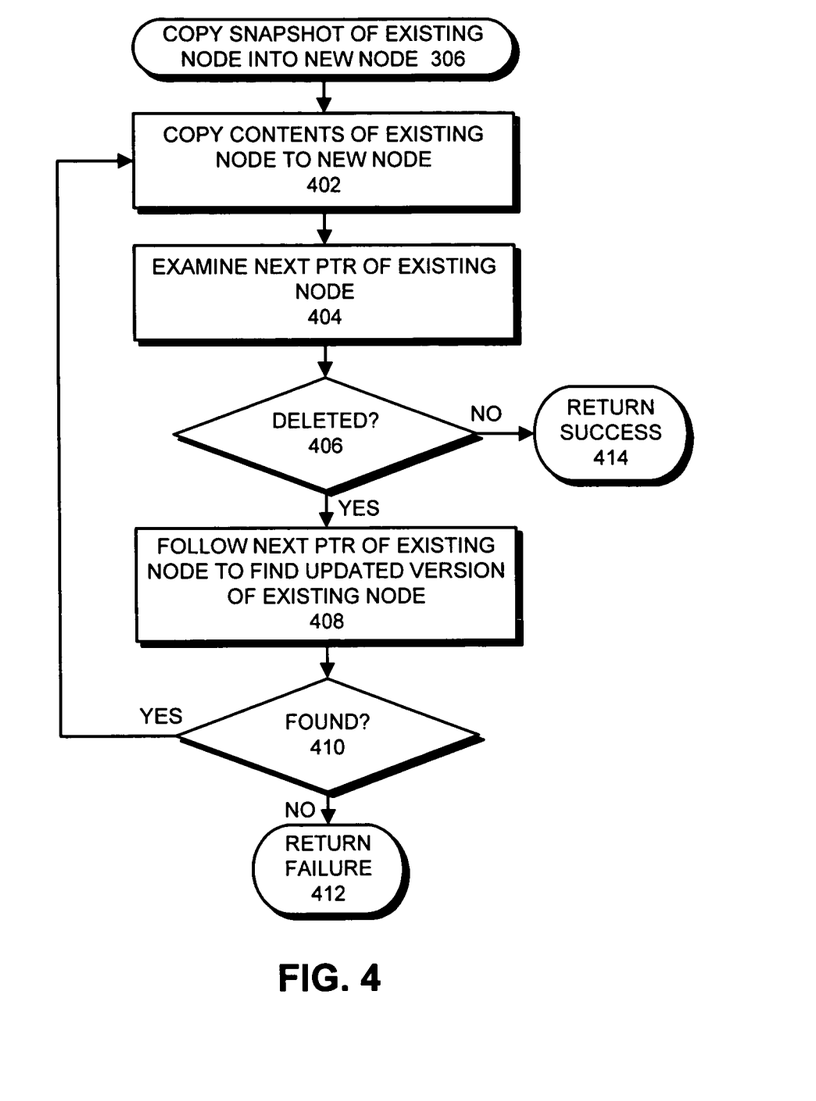
FIG. 4 presents a flow chart illustrating the process of copying a snapshot of an existing node to a new node in accordance with an embodiment of the present invention.

FIG. 4 presents a flow chart illustrating the process of copying a snapshot of an existing node to a new node in accordance with an embodiment of the present invention. This flow chart illustrates in more detail the operation described in step 306 of the flow chart illustrated in FIG. 3. First, the system copies the entire contents of existing node 214 into new node 218 (step 402). Next, the system examines the next pointer in existing node 214 (step 404) to determine if existing node 214 has been deleted (step 406). If not, the snapshot has been successfully copied and the system returns a success (step 414).

On the other hand, if existing node 214 has been deleted, the system can perform a remedial action. For example, in one embodiment of the present invention, the system follows the next pointer of existing node 214 in an attempt to find an updated version of existing node 214 (step 408). If an updated version is found, the system returns to step 402 to copy a snapshot of the updated version of existing node 214 to new node 218. Otherwise, if an updated version of existing node 214 cannot be found, the system returns a failure (step 412), and can possibly take other remedial actions.

Deleting a Node

Figure 5:
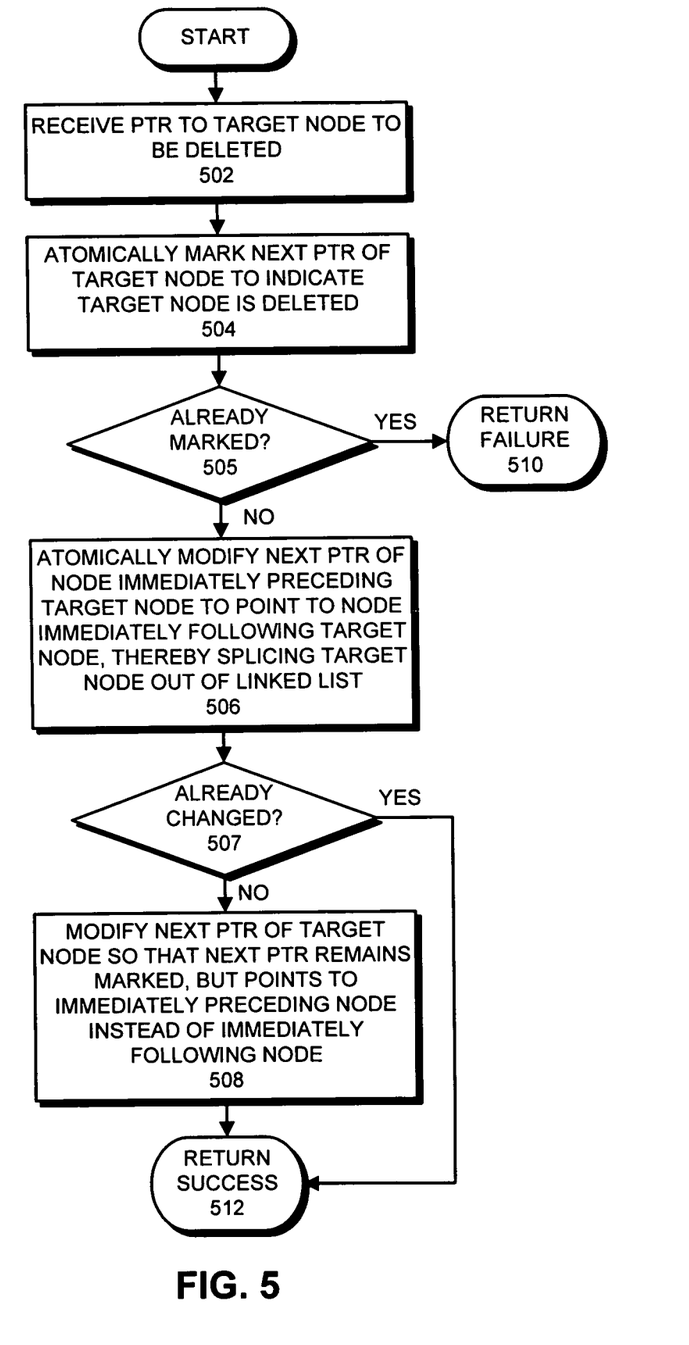
FIG. 5 presents a flow chart illustrating the process of deleting a node from a linked list in accordance with an embodiment of the present invention.

FIG. 5 presents a flow chart illustrating the process of deleting a node from a linked list in accordance with an embodiment of the present invention. The system starts with a pointer to a target node to be deleted (step 502).

Next, the system attempts to atomically mark the next pointer of the target node to indicate that the target node is deleted. Once the target node is marked in this way, all other processes in the system recognize its new status as a "deleted" node. This allows the other processes to complete the deletion operation if the original process performing the deletion operation stalls (step 504).

During the marking process, the system determines whether the next pointer of the target node is already marked (step 505). If so, the system returns a failure (step 510).

Otherwise, if the next pointer is not already marked in step 505 and the atomic operation succeeded, the system atomically modifies the next pointer of the node immediately preceding node the target node to point to the node immediately following the target node, thereby splicing the target node out of the linked list (step 506).

During this pointer-modification process, the system determines whether the pointer of the preceding node has already been changed (by another process) to point to the node immediately following the target node (step 507). If so, the system returns a success (step 512).

Otherwise, if at step 507 the pointer of the preceding node has not been changed, the system updates the marked-deleted next pointer of target node to remain marked-deleted but to point to the node immediately preceding the target node instead of the node immediately following the target node (step 508). The system then returns a success (step 512). This backwards-pointing next pointer allows a process that has been "stranded in the middle" of a partial deletion to pick up again at the node it would have been operating on if the deletion operation had completed instantly. Note that this optimization is not essential, but it can greatly improve the efficiency of the node deletion process.

Inserting a Node

Figure 6:
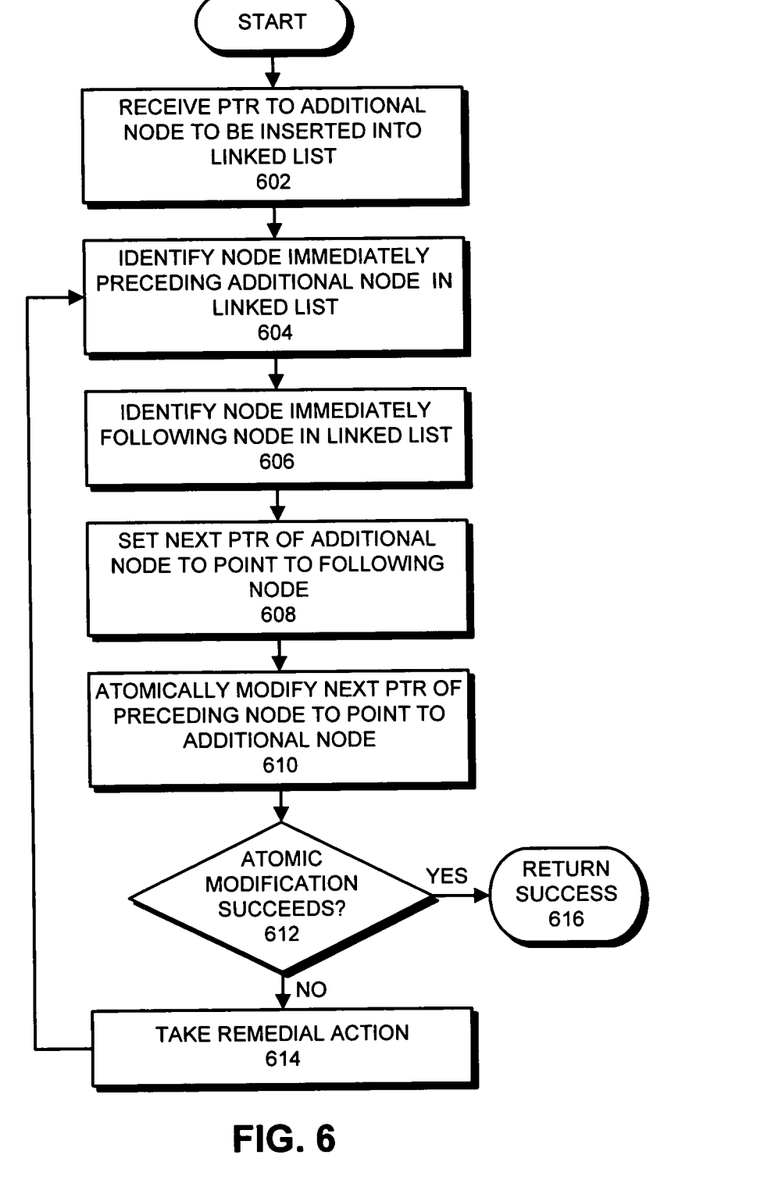
FIG. 6 presents a flow chart illustrating the process of inserting a node into a linked list in accordance with an embodiment of the present invention.

FIG. 6 presents a flow chart illustrating the process of inserting a node into a linked list in accordance with an embodiment of the present invention. The system starts by receiving a pointer to an additional node to be inserted into the linked list (step 602). Next, the system identifies a location in where the additional node is to be inserted into the linked list. This can involve scanning through the linked list to find a suitable location. At the end of this process, the system has identified a preceding node, which is to immediately precede the additional node in the linked list (step 604), and a following node, which is to immediately follow the additional node in the linked list (step 606).

Next, the system splices the additional node into the linked list by setting the next pointer of the additional node to point to the following node (step 608), and then atomically updating the next pointer of the preceding node to point the additional node (step 610).

The system then determines whether or not the atomic operation succeeded (step 612). (Note that if the predecessor's next pointer has been changed by another thread, this atomic update will fail.) If the atomic operation succeeds, the process is complete, and the system returns a success (step 616). Otherwise, the system takes a remedial action (step 614). This remedial action can involve identifying a new predecessor and possibly new following node and then repeating the insertion process. The system then returns to step 604 to reattempt the insertion process.

In a conventional linked list with pointers that do not indicate deletion, a problem can arise. Consider the case where a node B initially points to a successor node D, and the next pointer of node B is atomically moved to point to a new successor node C. In this case, another process may have deleted B while the next pointer of B was being atomically moved. If this happens, the new node C ends up being spliced onto a deleted node B, instead of being spliced into the linked list. The inclusion of the deleted indicator into the atomically modifiable next pointer blocks this potential failure, because deleting B changes its next pointer so that the atomic move to the new successor C from the old successor D will fail.

Reading a Snapshot of Multiple Fields in a Node

Figure 7:
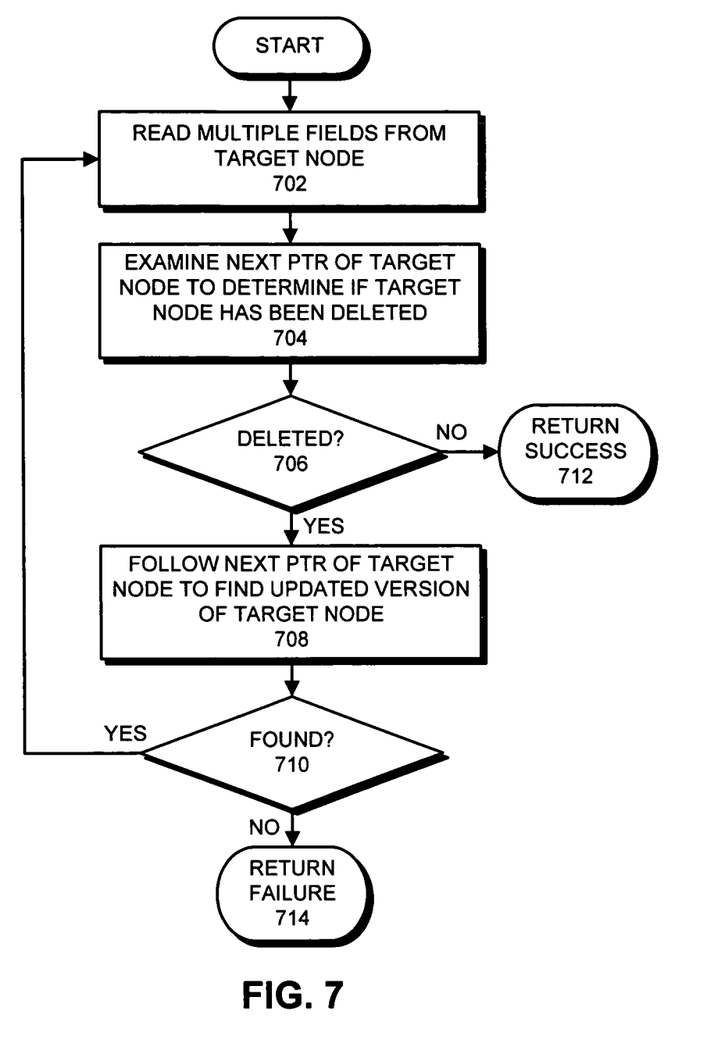
FIG. 7 presents a flow chart illustrating the process of reading multiple fields within a node in a linked list in accordance with an embodiment of the present invention.

FIG. 7 presents a flow chart illustrating the process of reading a snapshot of multiple fields from a target node in a linked list in accordance with an embodiment of the present invention. This process is similar to the process of copying the snapshot of the existing node to the new node, which was discussed above with reference to FIG. 4.

The system first reads the multiple fields from the target node (step 702). Next, the system examines the next pointer of the target node (step 704) to determine if the target node has been deleted (step 706). If the target node has not been deleted, the snapshot of the multiple fields has been successfully read and the system returns a success (step 712).

Otherwise, if the target node has been deleted, the system can perform a remedial action. In one embodiment of the present invention, the remedial action involves following the next pointer of the target node in an attempt to find an updated version of the target node (step 708). If an updated version is found, the system returns to step 702 to read the corresponding multiple fields from the updated version of the target node. Otherwise, the system returns a failure (step 714), and can take any one of a number of possible remedial actions.

To improve efficiency, prior to reading the multiple fields, the system can optionally examine the next pointer of the target node to determine if the target node is deleted, and if so, can skip reading the multiple fields.

Note that the present invention only updates values in a node by atomically replacing the node with a new node. Hence, even if the next pointer of a node indicates that the node has been deleted, the node still contains a historical snapshot of a coherent set of related values.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing a lock-free update to one or more fields in an existing node in a linked list, comprising:
   receiving a reference to the existing node in the linked list, wherein the existing node contains the one or more fields to be updated;
   obtaining a new node to be added to the linked list, wherein other processes do not possess references to the new node and therefore cannot initially access the new node;
   copying a snapshot of the existing node to the new node, which includes copying a next pointer of the existing node to the new node, so that the new node points to a node immediately following the existing node, wherein said copying involves locating a version of the existing node that has not been deleted, and wherein said locating involves iteratively examining and following one or more next pointers;
   updating one or more fields in the new node that correspond to the one or more fields in the existing node;
   performing a single atomic operation that modifies the next pointer of the existing node to point to the new node and also marks the next pointer to indicate that the existing node is deleted, whereby the new node becomes part of the linked list and the existing node is deleted in a single atomic operation; and
   splicing the existing node out of the linked list by atomically modifying the next pointer of a node immediately preceding the existing node in the linked list to point to the new node, instead of pointing to the existing node.

2. The method of claim 1, wherein if a process that deleted the existing node does not perform the splicing operation, another process, which subsequently detects that the existing node has been deleted, performs the splicing operation.

3. The method of claim 1, further comprising deleting a target node from the linked list by:
   receiving a reference to the target node to be deleted from the linked list;
   atomically marking a next pointer in the target node to indicate that the target node is deleted; and
   atomically modifying the next pointer of a node immediately preceding the target node in the linked list to point to a node immediately following the target node in the linked list, instead of pointing to the target node, thereby splicing the target node out of the linked list.

4. The method of claim 3, wherein after the target node is spliced out of the linked list, the method further comprises modifying the next pointer of the target node so that the next pointer remains marked but points to a node immediately preceding the target node instead of the node immediately following node the target node in the linked list.

5. The method of claim 1, further comprising inserting an additional node into the linked list by:
   identifying a node immediately preceding the additional node in the linked list;
   identifying a node immediately following the additional node in the linked list; and
   splicing the additional node into the linked list by,
      setting the next pointer for the additional node to point to the immediately following node, and
      atomically updating the next pointer of the immediately preceding node to point to the additional node.

6. The method of claim 1, further comprising reading a snapshot of multiple fields from a target node in the linked list by:
   reading the multiple fields from the target node;
   examining the next pointer of the target node to determine if the target node has been deleted; and
   if so, taking a remedial action;
   otherwise, not taking the remedial action.

7. The method of claim 6, wherein taking the remedial action involves:
   following the next pointer of the target node in an attempt to find an updated version of the target node;
   if an updated version of the target node is found, repeating the process of reading a snapshot of the multiple fields from the updated version of the target node; and
   if an updated version of the existing node is not found, indicating that the remedial action fails.

8. The method of claim 1, wherein atomically modifying the next pointer of the existing node to indicate that the existing node is deleted involves setting a "deleted bit" in the next pointer.

9. The method of claim 1, wherein while atomically modifying the next pointer of the existing node,
   if the next pointer indicates that the existing node is already deleted, the atomic modification operation fails and the method further comprises taking a remedial action to deal with the fact that the existing node is already deleted;

otherwise, continuing performing the atomic modification operation.

10. The method of claim 1, wherein a given node in the linked list includes:
   a key that contains an identifier for the given node;
   one or more fields containing data values or pointers to data values associated with the given node; and
   a next pointer that contains the address of a node that immediately follows the given node in the linked list, and that also contains a deleted indicator, which indicates whether the given node has been deleted.

11. The method of claim 1, further comprising periodically performing a garbage-collection operation to reclaim deleted nodes that have become unreachable.

12. A non-transitory computer-readable storage medium storing instructions that when executed by a computer cause the computer to perform a method for performing a lock-free update to one or more fields in an existing node in a linked list, the method comprising:
   receiving a reference to the existing node in the linked list, wherein the existing node contains the one or more fields to be updated;
   obtaining a new node to be added to the linked list, wherein other processes do not possess references to the new node and therefore cannot initially access the new node;
   copying a snapshot of the existing node to the new node, which includes copying a next pointer of the existing node to the new node so that the new node points to a node immediately following the existing node, wherein said copying involves locating a version of the existing node that has not been deleted, and wherein said locating involves iteratively examining and following one or more next pointers;
   updating one or more fields in the new node that correspond to the one or more fields in the existing node;
   performing a single atomic operation that modifies a next pointer of the existing node to point to the new node and also marks the next pointer to indicate that the existing node is deleted, whereby the new node becomes part of the linked list and the existing node is deleted in a single atomic operation; and
   splicing the existing node out of the linked list by atomically modifying the next pointer of a node immediately preceding the existing node in the linked list to point to the new node, instead of pointing to the existing node.

13. The non-transitory computer-readable storage medium of claim 12, wherein if a process that deleted the existing node does not perform the splicing operation, another process, which subsequently detects that the existing node has been deleted, performs the splicing operation.

14. The non-transitory computer-readable storage medium of claim 12, wherein the method further comprises deleting a target node from the linked list by:
   receiving a reference to the target node to be deleted from the linked list;
   atomically marking a next pointer in the target node to indicate that the target node is deleted; and
   atomically modifying the next pointer of a node immediately preceding the target node in the linked list to point to a node immediately following the target node in the linked list, instead of pointing to the target node, thereby splicing the target node out of the linked list.

15. The non-transitory computer-readable storage medium of claim 14, wherein after the target node is spliced out of the linked list, the method further comprises modifying the next pointer of the target node so that the next pointer remains marked but points to a node immediately preceding the target node instead of the node immediately following node the target node in the linked list.

16. The non-transitory computer-readable storage medium of claim 12, wherein the method further comprises inserting an additional node into the linked list by:
   identifying a node immediately preceding the additional node in the linked list;
   identifying a node immediately following the additional node in the linked list; and
   splicing the additional node into the linked list by,
      setting the next pointer for the additional node to point to the immediately following node, and
      atomically updating the next pointer of the immediately preceding node to point to the additional node.

17. The non-transitory computer-readable storage medium of claim 12, wherein the method further comprises reading a snapshot of multiple fields from a target node in the linked list by:
   reading the multiple fields from the target node;
   examining the next pointer of the target node to determine if the target node has been deleted; and
   if so, taking a remedial action;
   otherwise, not taking the remedial action.

18. The non-transitory computer-readable storage medium of claim 17, wherein taking the remedial action involves:
   following the next pointer of the target node in an attempt to find an updated version of the target node;
   if an updated version of the target node is found, repeating the process of reading a snapshot of the multiple fields from the updated version of the target node; and
   if an updated version of the existing node is not found, indicating that the remedial action fails.

19. The non-transitory computer-readable storage medium of claim 12, wherein atomically modifying the next pointer of the existing node to indicate that the existing node is deleted involves setting a "deleted bit" in the next pointer.

20. The non-transitory computer-readable storage medium of claim 12, wherein while atomically modifying the next pointer of the existing node,
   if the next pointer indicates that the existing node is already deleted, the atomic modification operation fails and the method further comprises taking a remedial action to deal with the fact that the existing node is already deleted;
   otherwise, continuing performing the atomic modification operation.

21. The non-transitory computer-readable storage medium of claim 12, wherein a given node in the linked list includes:
   a key that contains an identifier for the given node;
   one or more fields containing data values or pointers to data values associated with the given node; and
   a next pointer that contains the address of a node that immediately follows the given node in the linked list, and that also contains a deleted indicator, which indicates whether the given node has been deleted.

22. The non-transitory computer-readable storage medium of claim 12, wherein the method further comprises periodically performing a garbage-collection operation to reclaim deleted nodes that have become unreachable.

23. An apparatus that performs a lock-free update to one or more fields in an existing node in a linked list, comprising:
   a node obtaining mechanism configured to obtain a new node to be added to the linked list, wherein other processes do not possess references to the new node and therefore cannot initially access the new node;

a copying mechanism configured to copy a snapshot of the existing node to the new node, which includes copying a next pointer of the existing node to the new node so that the new node points to a node immediately following the existing node, wherein said copying involves locating a version of the existing node that has not been deleted, and wherein said locating involves iteratively examining and following one or more next pointers;

an updating mechanism configured to update one or more fields in the new node that correspond to the one or more fields in the existing node;

a modification mechanism configured to perform a single atomic operation that modifies a next pointer of the existing node to point to the new node and also marks the next pointer to indicate that the existing node is deleted, whereby the new node becomes part of the linked list and the existing node is deleted in a single atomic operation; and a splicing mechanism configured to splice the existing node out of the linked list by atomically modifying the next pointer of a node immediately preceding the existing node in the linked list to point to the new node, instead of pointing to the existing node.

24. The apparatus of claim 23, wherein if a process that deleted the existing node does not activate the splicing mechanism, another process, which subsequently detects that the existing node has been deleted, activates the splicing mechanism.

25. The apparatus of claim 23, further comprising a deletion mechanism configured to delete a target node from the linked list, wherein the deletion mechanism is configured to:

receive a reference to the target node to be deleted from the linked list;

atomically mark a next pointer in the target node to indicate that the target node is deleted; and to atomically modify the next pointer of a node immediately preceding the target node in the linked list to point to a node immediately following the target node in the linked list, instead of pointing to the target node, thereby splicing the target node out of the linked list.

26. The apparatus of claim 25, wherein after the target node is spliced out of the linked list, the deletion mechanism is configured to modify the next pointer of the target node so that the next pointer remains marked but points to a node immediately preceding the target node instead of the node immediately following node the target node in the linked list.

27. The apparatus of claim 23, further comprising an insertion mechanism configured to insert an additional node into the linked list, wherein the insertion mechanism is configured to:

identify a node immediately preceding the additional node in the linked list;

identify a node immediately following the additional node in the linked list; and to splice the additional node into the linked list by,
setting the next pointer for the additional node to point to the immediately following node, and
atomically updating the next pointer of the immediately preceding node to point to the additional node.

28. The apparatus of claim 23, further comprising a reading mechanism configured to read a snapshot of multiple fields from a target node in the linked list, wherein the reading mechanism is configured to:

read the multiple fields from the target node;
examine the next pointer of the target node to determine if the target node has been deleted; and
if so, to take a remedial action;
otherwise, not taking the remedial action.

29. The apparatus of claim 28, wherein while taking the remedial action, the reading mechanism is configured to:

follow the next pointer of the target node in an attempt to find an updated version of the target node;
if an updated version of the target node is found, to repeat the process of reading a snapshot of the multiple fields from the updated version of the target node; and
if an updated version of the existing node is not found, indicating that the remedial action fails.

30. The apparatus of claim 23, wherein while atomically modifying the next pointer of the existing node to indicate that the existing node is deleted, the modification mechanism is configured to set a "deleted bit" in the next pointer.

31. The apparatus of claim 23, wherein while atomically modifying the next pointer of the existing node, if the next pointer indicates that the existing node is already deleted, the modification mechanism is configured to:
fail the modification operation fails; and to
take a remedial action to deal with the fact that the existing node is already deleted;
otherwise, continue performing the atomic modification operation.

32. The apparatus of claim 23, wherein a given node in the linked list includes:

a key that contains an identifier for the given node;
one or more fields containing data values or pointers to data values associated with the given node; and
a next pointer that contains the address of a node that immediately follows the given node in the linked list, and that also contains a deleted indicator, which indicates whether the given node has been deleted.

33. The apparatus of claim 23, further comprising a garbage collection mechanism configured to periodically perform a garbage-collection operation to reclaim deleted nodes that have become unreachable.

* * * * *

UNITED STATES PATENT AND TRADEMARK OFFICE
CERTIFICATE OF CORRECTION

PATENT NO.        : 8,768,889 B1                                              Page 1 of 1
APPLICATION NO.   : 10/820661
DATED             : July 1, 2014
INVENTOR(S)       : Martin It is certified that error appears in the above-identified patent and that said Letters Patent is hereby corrected as shown below:

On Title page, column 2, under Other Publications, line 2, delete "Professoinal." and insert
    -- Professional. --, therefor.

Signed and Sealed this
Seventeenth Day of March, 2015

Michelle K. Lee
*Director of the United States Patent and Trademark Office*